United States Patent
Chen et al.

(10) Patent No.: US 8,538,497 B2
(45) Date of Patent: Sep. 17, 2013

(54) ELECTRONIC DEVICE AND FIXING STRUCTURE THEREOF

(75) Inventors: Ming-Hui Chen, Taipei (TW);
Chia-Chen Chen, Taipei (TW);
Shih-Hsun Yang, Taipei (TW);
Pin-Chang Chu, Taipei (TW);
Chih-Chia Chang, Taipei (TW);
Cheng-Tai Ho, Taipei (TW)

(73) Assignee: Inventec Corporation, Taipei (TW)

( * ) Notice: Subject to any disclaimer, the term of this patent is extended or adjusted under 35 U.S.C. 154(b) by 258 days.

(21) Appl. No.: 13/239,975

(22) Filed: Sep. 22, 2011

(65) Prior Publication Data

US 2012/0329408 A1 Dec. 27, 2012

(30) Foreign Application Priority Data

Jun. 22, 2011 (TW) .............................. 100121905 A

(51) Int. Cl.
*H04M 1/00* (2006.01)
*H04B 7/00* (2006.01)
*H01Q 1/24* (2006.01)
*H04W 84/18* (2009.01)

(52) U.S. Cl.
CPC ............... *H01Q 1/243* (2013.01); *H04W 84/18* (2013.01)
USPC ........ 455/575.7; 455/41.1; 455/41.2; 343/702

(58) Field of Classification Search
USPC .............. 455/575.5, 575.7, 575.8, 41.1, 41.2, 455/41.3; 340/702
See application file for complete search history.

(56) References Cited

U.S. PATENT DOCUMENTS

| | | | | |
|---|---|---|---|---|
| 5,838,789 A * | 11/1998 | Mendolia | ................. | 379/433.13 |
| 6,232,924 B1 * | 5/2001 | Winstead et al. | ............. | 343/702 |
| 6,873,291 B2 * | 3/2005 | Aoyama et al. | ........ | 343/700 MS |
| 7,158,084 B2 * | 1/2007 | Kim et al. | ...................... | 343/702 |
| 7,349,724 B2 * | 3/2008 | Fenk | .......................... | 455/575.5 |
| 7,397,434 B2 * | 7/2008 | Mun et al. | ..................... | 343/702 |
| 7,512,413 B2 * | 3/2009 | Hui et al. | ................... | 455/550.1 |
| 7,605,765 B2 * | 10/2009 | Ku | ................................. | 343/702 |
| 2005/0001771 A1 * | 1/2005 | Tanaka et al. | ................. | 343/702 |
| 2006/0145934 A1 * | 7/2006 | Park et al. | ..................... | 343/702 |

* cited by examiner

*Primary Examiner* — Duc M Nguyen
(74) *Attorney, Agent, or Firm* — Morris Manning & Martin LLP; Tim Tingkang Xia, Esq.

(57) ABSTRACT

A fixing structure including a metal housing and a fixing base is disclosed. The housing has a carrying plane and the fixing base having a first contact end and, opposite, a second contact end is disposed on the housing. The perpendicular distance from the first contact end to the carrying plane is greater than that from the second contact end to the carrying plane. A wireless transmission device is disposed on the fixing base and in contact with the first contact end and the second contact end, so that a perpendicular distance from an antenna end of the wireless transmission device to the carrying plane is greater than a perpendicular distance from a fixed end of the wireless transmission device to the carrying plane. Therefore, a relatively great distance is kept between the antenna end and the housing for preventing the antenna end from being interfered by the metal housing.

10 Claims, 3 Drawing Sheets

ELECTRONIC DEVICE AND FIXING STRUCTURE THEREOF

CROSS-REFERENCE TO RELATED APPLICATIONS

This non-provisional application claims priority under 35 U.S.C. §119(a) on patent application Ser. No. 100121905 filed in Taiwan, R.O.C. on Jun. 22, 2011, the entire contents of which are hereby incorporated by reference.

BACKGROUND

1. Technical Field

The present disclosure relates to an electronic device and a fixing structure thereof, and more particularly to an electronic device with a wireless transmission device and a fixing structure used for fixing the wireless transmission device.

2. Related Art

In recent years, with the rapid development of science and the information industry, the manufacturing technology of notebook computers also develops and improves day by day. When a conventional notebook computer performs data transmission with other electronic devices, the transmission is only possible when the notebook computer is connected with other electronic devices through a transmission cable. However, this method is not convenient because when a user forgets to carry the transmission cable, the data transmission is not possible. Therefore, wireless transmission technology is developed in the prior art, so that the user can perform the data transmission through the wireless transmission technology instead of the transmission cable.

Generally, there are two types of wireless transmission, namely, infrared transmission in an early stage and common Bluetooth transmission at present. The Bluetooth technology is a small-range radio frequency technology, which enables electronic devices to communicate with each other through radio frequencies, so that the communication is not restricted by the transmission cables. In addition, the Bluetooth technology has a better transmission ability than the infrared transmission does. The Bluetooth technology features a long transmission distance with the directions being unlimited. Consequently, the Bluetooth technology gradually replaces the infrared transmission, and all notebook computers selling on the market at present have built-in Bluetooth devices. Therefore, the Bluetooth device is a necessary component for notebook computers nowadays.

The Bluetooth device is usually fixed in housing of the notebook computer. In addition, considering the appearance, the housing is usually made of a metal material. Since the housing made of the metal material reduces the signal transmission and receiving effect of the Bluetooth device, the wireless transmission effect of the notebook computer is affected significantly.

SUMMARY

Accordingly, the disclosure relates to an electronic device and a fixing structure thereof for solving the problem that the signal transmission and receiving effect of the Bluetooth device is reduced due to the interference from the housing made of the metal material.

An electronic device disclosed in an embodiment comprises a housing, a fixing base and a wireless transmission device. The housing has a carrying plane, and the fixing base is disposed on the housing. The fixing base has a first contact end and a second contact end opposite to each other. The distance from the first contact end to the carrying plane is greater than the distance from the second contact end to the carrying plane. The wireless transmission device is disposed on the fixing base and is in contact with the first contact end and the second contact end. The wireless transmission device has a fixing end and an antenna end opposite to each other. The perpendicular distance from the antenna end to the carrying plane is greater than the perpendicular distance from the fixing end to the carrying plane.

The fixing structure disclosed in the embodiment is applicable to fixing a wireless transmission device. The fixing structure comprises a housing and a fixing base. The housing has a carrying plane, and the fixing base is disposed on the housing. The fixing base has a first contact end and a second contact end opposite to each other. The perpendicular distance from the first contact end to the carrying plane is greater than the perpendicular distance from the second contact end to the carrying plane. The first contact end and the second contact end are used for the wireless transmission device to make contact with, so that the fixing base may be disposed on the fixing base.

In the electronic device and the fixing structure thereof according to the above embodiment, the distance from the first contact end of the fixing base to the carrying plane is greater than the distance from the second contact end to the carrying plane. Accordingly, when the wireless transmission device is disposed on the fixing base, a relatively large distance can be kept between the antenna end of the wireless transmission device and the carrying plane, and, therefore, a distance as great as possible exist between the wireless transmission device and the housing. Therefore, such a design of the fixing structure can prevent the wireless transmission device from being interfered by the housing, thereby improving the wireless transmission capability of the electronic device.

DETAILED DESCRIPTION

Figure 1A:
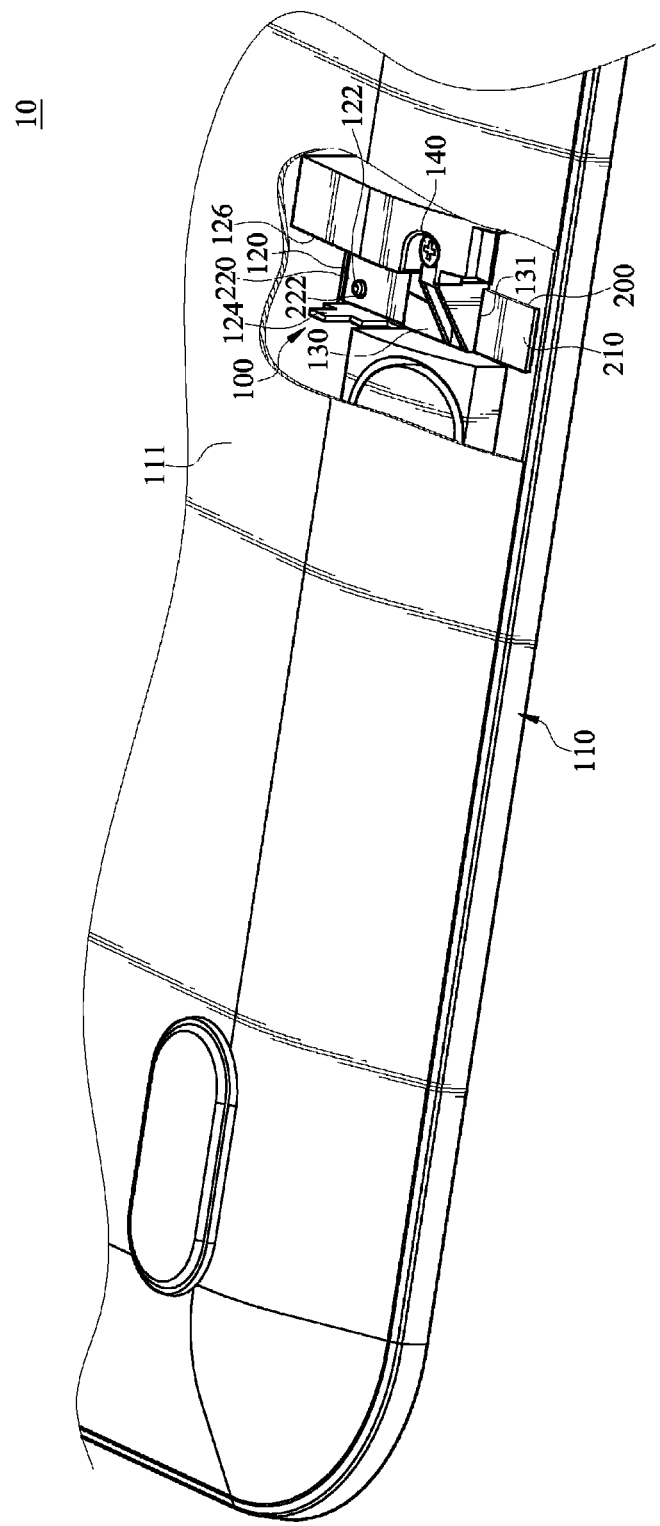
FIG. 1A is a three dimensional view of an electronic device according to an embodiment.
Figure 1B:
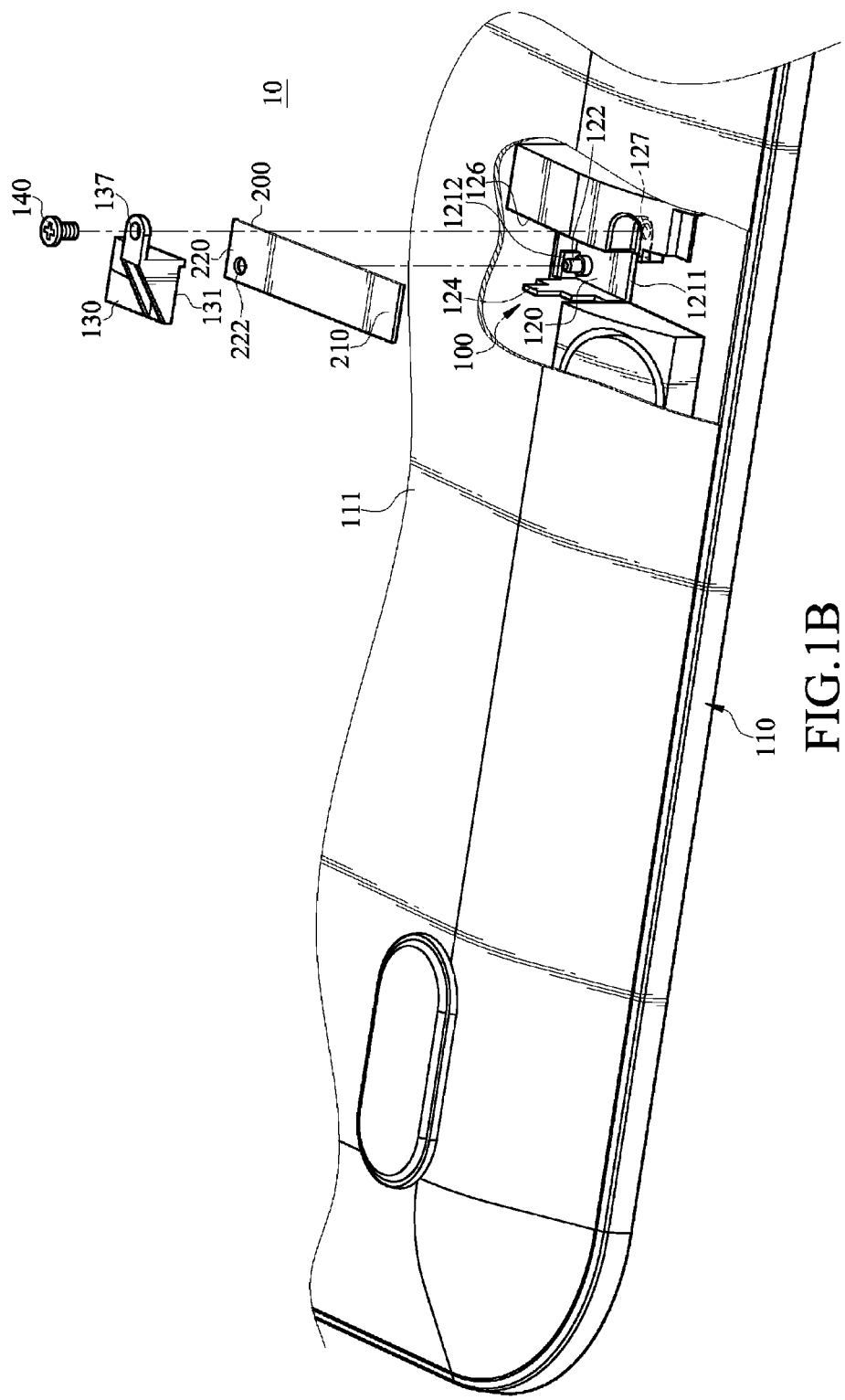
FIG. 1B is an exploded view of the electronic device in the FIG. 1A.
Figure 2:
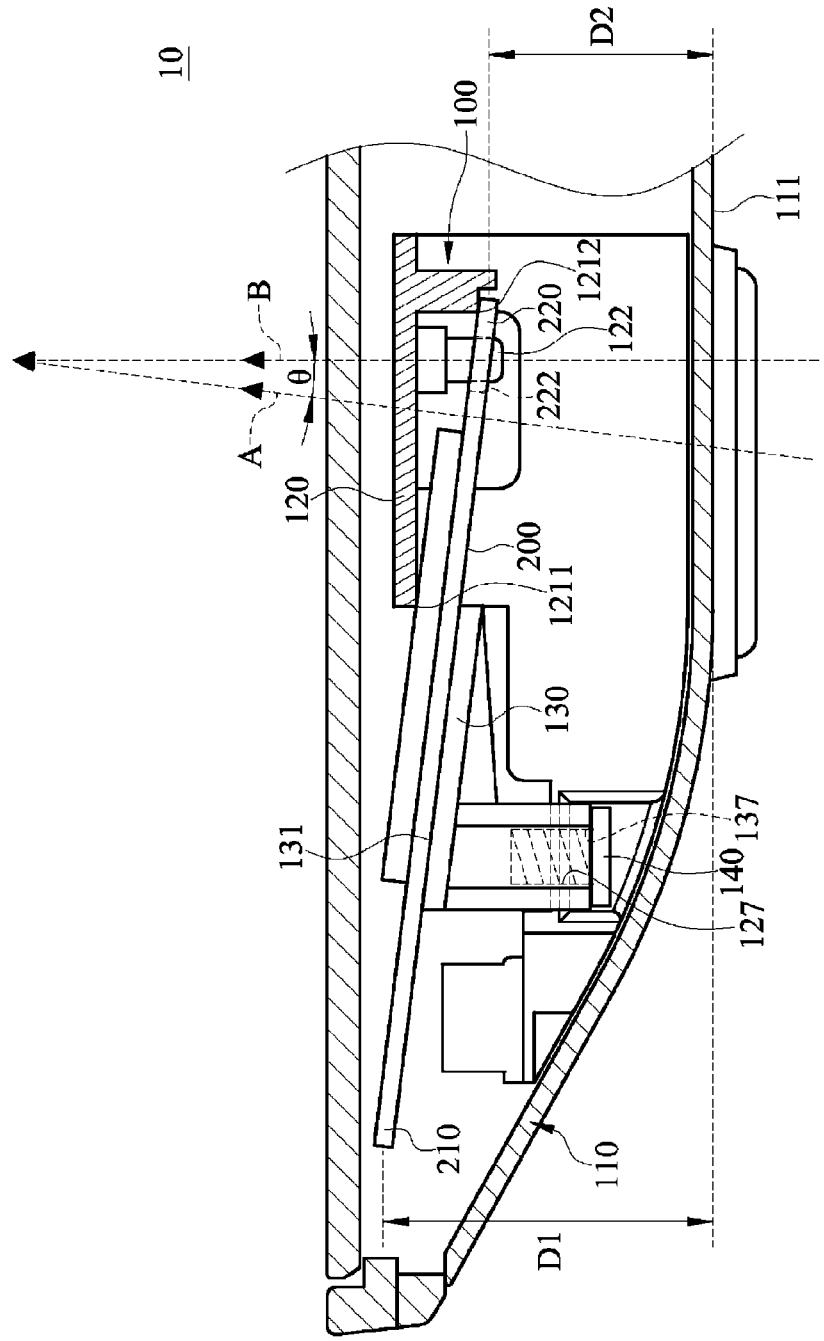
FIG. 2 is a sectional view of the electronic device in the FIG. 1A.

Referring to FIG. 1A, FIG. 1B and FIG. 2, FIG. 1A is a three dimensional view of an electronic device according to an embodiment; FIG. 1B is an exploded view of the electronic device in the FIG. 1 1A; FIG. 2 is a sectional view of the electronic device in the FIG. 1A.

The electronic device 10 of the embodiment is, for example, a portable mobile electronic device such as a portable personal notebook computer or personal mobile phone. The embodiment is illustrated by taking the personal notebook computer as an example, but is not limited thereto.

The electronic device 10 of the embodiment comprises a fixing structure 100 and a wireless transmission device 200 fixed by the fixing structure 100. The fixing structure 100 comprises a housing 110 made of a metal material and a fixing base 120. In addition, the fixing structure 100 further comprises a fixing cover 130 and a fixing member 140. The housing 110 of the embodiment is, for example, but not limited to, a housing of the personal notebook computer. Moreover, considering the appearance of the housing 110, the material of the housing 110 may usually be a metal material, a plastic material with a coated metal film on the inner side thereof, or a plastic material with an aluminum foil sheet on the inner side thereof. The housing 110 of the embodiment has a carrying plane 111. In this embodiment, the carrying plane 111 is a bottom surface of the housing. Specifically, when a user puts the electronic device 10 on a horizontal plane, the carrying plane 111 faces the horizontal plane and is also parallel to the horizontal plane.

The fixing base 120 is disposed in the housing 110, and has a first contact end 1211 and a second contact end 1212 opposite to each other. In detail, the first contact end 1211 and the second contact end 1212 are located at two opposite end edges of the fixing base 120, and the perpendicular distance from the first contact end 1211 to the carrying plane 111 is greater than the perpendicular distance from the second contact end 1212 to the carrying plane 111. Specifically, a height difference exists between the first contact end 1211 and the second contact end 1212, and the shortest distance between the first contact end 1211 and the carrying plane 111 is greater than the shortest distance between the second contact end 1212 and the carrying plane 111.

In addition, the fixing base 120 further has a positioning post 122 located between the first contact end 1211 and the second contact end 1212. The positioning post 122 is adjacent to the second contact end 1212, and the axis of the positioning post 122 is parallel to the normal vector of the carrying plane.

Moreover, on two opposite sides of the fixing base 120 are a first side wall 124 and a second side wall 126 opposite to each other. The first contact end 1211, the second contact end 1212 and the positioning post 122 are located between the first side wall 124 and the second side wall 126.

The wireless transmission device 200 of the embodiment is disposed on the fixing base 120, and the wireless transmission device 200 is, but not limited to, a Bluetooth device. The wireless transmission device 200 has a fixing end 220 and an antenna end 210 opposite to each other, and the antenna end 210 has an antenna used for receiving or transmitting signals. The fixing end 220 of the wireless transmission device 200 has a positioning hole 222 corresponding to the positioning post 122. When the wireless transmission device 200 is disposed on the fixing base 120, the positioning post 122 passes through the positioning hole 222. Moreover, a surface of the wireless transmission device 200 abuts the first contact end 1211 and the second contact end 1212, and two opposite sides of the wireless transmission device 200 respectively abut the first side wall 124 and the second side wall 126. Also, the direction from the first contact end 1211 to the second contact end 1212 is parallel to the direction from the fixing end 220 to the antenna end 210. As shown in FIG. 2, since the perpendicular distance from the first contact end 1211 to the carrying plane 111 is greater than the perpendicular distance from the second contact end 1212 to the carrying plane 111, a perpendicular distance D1 from the antenna end 210 to the carrying plane 111 is also greater than a perpendicular distance D2 from the fixing end 220 to the carrying plane 111 when the wireless transmission device 200 abuts the first contact end 1211 and the second contact end 1212. In other words, when assembled to the fixing base 120, the wireless transmission device 200 is tilted relative to the carrying plane 111.

The fixing cover 130 of the embodiment is disposed on the second side wall 126 in a detachable manner. The fixing cover 130 has a through hole 137 corresponding to a locking hole 127 of the second side wall 126. The locking member 140 passes through the through hole 137 and is fastened to the locking hole 127. The fixing member 140 may be a screw, and the locking hole 127 may be a screw hole. The fixing cover 130 also has a fixing surface 131 facing the fixing base 120.

When the wireless transmission device 200 is disposed on the fixing base 120, the fixing surface 131 is attached to a surface of the wireless transmission device 200 opposite to the fixing base 120. In detail, two opposite surfaces of the wireless transmission device 200 contact the fixing surface 131, the first contact end 1211 and the second contact end 1212, so that the wireless transmission device 200 is clamped between the fixing base 120 and the fixing cover 130. In addition, since the wireless transmission device 200 is tilted relative to the carrying plane 111, the fixing surface 131 is also tilted relative to the carrying plane 111 to be attached to the wireless transmission device 200. In other words, an acute angle θ is formed between the normal vector A of the fixing surface 131 and the normal vector B of the carrying plane 111, so that the wireless transmission device 200 can be firmly fixed on the fixing base 120, thereby the perpendicular distance D1 from the antenna end 210 to the carrying plane 111 is greater than the perpendicular distance D2 from the fixing end 220 to the carrying plane 111.

Since the wireless transmission device 200 is fixed on the fixing base 120 in a tilted manner relative to the carrying plane 111, a relatively large distance can be kept between the antenna end 210 of the wireless transmission device 200 and the carrying plane 111. Accordingly, a distance as large as possible can be kept between the antenna end 210 of the wireless transmission device 200 and the housing 110 made of the metal material, so as to avoid the problem that the signal transmission and receiving effect of the wireless transmission device 200 is reduced due to the interference from the metal material of the housing 110. It should be noted that, the value of the perpendicular distance D1 from the antenna end 210 to the carrying plane 111 is not intended to limit the embodiment, and people skilled in the art may adjust the perpendicular distance D1 from the antenna end 210 to the carrying plane 111 according to an actual situation to obtain a good receiving or transmission effect of the wireless transmission device 200.

In addition, since the positioning post 122 of the fixing base 120 passes through the positioning hole 222 of the wireless transmission device 200, the positioning post 122 limits a displacement direction of the wireless transmission device 200 from the first contact end 1211 to the second contact end 1212. Moreover, the first side wall 124 and the second side wall 126 abut the two opposite sides of the wireless transmission device 200 to limit a possible rotary displacement of the wireless transmission device 200 with the positioning post 122 as a rotation center. Also, the fixing surface 131, the first contact end 1211, and the second contact end 1212 make contact and abut the two opposite surfaces of the wireless transmission device 200, so that the wireless transmission device 200 cannot easily escape from an axial direction of the positioning post 122. Therefore, through a fixing method of the fixing structure 100, the wireless transmission device 200 can be firmly fixed on the fixing base.

In the electronic device and the fixing structure thereof according to the above embodiment, the perpendicular distance from the first contact end of the fixing base to the carrying plane is greater than the perpendicular distance from the second contact end to the carrying plane. In this manner, when the wireless transmission device is disposed on the fixing base, a relatively large distance exists between the antenna end of the wireless transmission device and the carrying plane, and accordingly a distance as great as possible exists between the wireless transmission device and the housing. Therefore, such a design of the fixing structure can firmly fix the wireless transmission device on the fixing base while preventing the wireless transmission device from being interfered by the housing made of the metal material, thereby improving the wireless transmission capability of the electronic device.

What is claimed is:

1. An electronic device, comprising:
   a housing, having a carrying plane;
   a fixing base disposed on the housing, the fixing base having a first contact end and a second contact end opposite to each other, and a perpendicular distance from the first contact end to the carrying plane being greater than a perpendicular distance from the second contact end to the carrying plane; and
   a wireless transmission device disposed on the fixing base and contacting the first contact end and the second contact end, the wireless transmission device having a fixing end and an antenna end opposite to each other, and a perpendicular distance from the antenna end to the carrying plane being greater than a perpendicular distance from the fixing end to the carrying plane.

2. The electronic device according to claim 1, wherein the fixing base has a first side wall and a second side wall located on two opposite sides of the fixing base, and two opposite sides of the electronic device respectively abutted the first side wall and the second side wall.

3. The electronic device according to claim 1, wherein the fixing base further has a positioning post located between the first contact end and the second contact end, the fixing end of the electronic device has a positioning hole, and the positioning post passes through the positioning hole.

4. The electronic device according to claim 1, further comprising a fixing cover disposed on the housing, the fixing cover having a fixing surface, the fixing surface contacts a surface of the wireless transmission device, and an acute angle is formed between a normal vector of the fixing surface and a normal vector of the carrying plane.

5. The electronic device according to claim 1, wherein the wireless transmission device further has a positioning hole, on two opposite sides of the fixing base are a first side wall and a second side wall, the fixing base further has a positioning post located between the first side wall and the second side wall, two opposite sides of the wireless transmission device respectively abut the first side wall and the second side wall, the positioning post is inserted into the positioning hole, and the electronic device further comprises a fixing cover disposed on the second side wall, the fixing cover has a fixing surface, the fixing surface is attached to a surface of the wireless transmission device, and an acute angle is formed between a normal vector of the fixing surface and a normal vector of the carrying plane.

6. A fixing structure, applicable to fixing a wireless transmission device, comprising:
   a housing, having a carrying plane; and
   a fixing base disposed on the housing, the fixing base having a first contact end and a second contact end opposite to each other, a perpendicular distance from the first contact end to the carrying plane being greater than a perpendicular distance from the second contact end to the carrying plane, and the first contact end and the second contact end being used for abutting by the wireless transmission device, so that the wireless transmission device are disposed on the fixing base.

7. The fixing structure according to claim 6, wherein the fixing base further has a first side wall and a second side wall located on two opposite sides of the fixing base.

8. The fixing structure according to claim 6, wherein the fixing base further has a positioning post located between the first contact end and the second contact end.

9. The fixing structure according to claim 6, further comprising a fixing cover disposed on the housing, the fixing cover having a fixing surface spaced from the fixing base by a distance, and an acute angle is formed between a normal vector of the fixing surface and a normal vector of the carrying plane.

10. The fixing structure according to claim 6, wherein the fixing base has a first side wall and a second side wall located on two opposite sides of the fixing base, the fixing base further has a fixing post, the fixing post is located between the first side wall and the second side wall, the fixing structure further comprises a fixing cover disposed on the second side wall, the fixing cover has a fixing surface, the fixing surface is spaced from the fixing base by a distance, and an acute angle is formed between a normal vector of the fixing surface and a normal of the carrying plane.

* * * * *